Figures 1, 2:
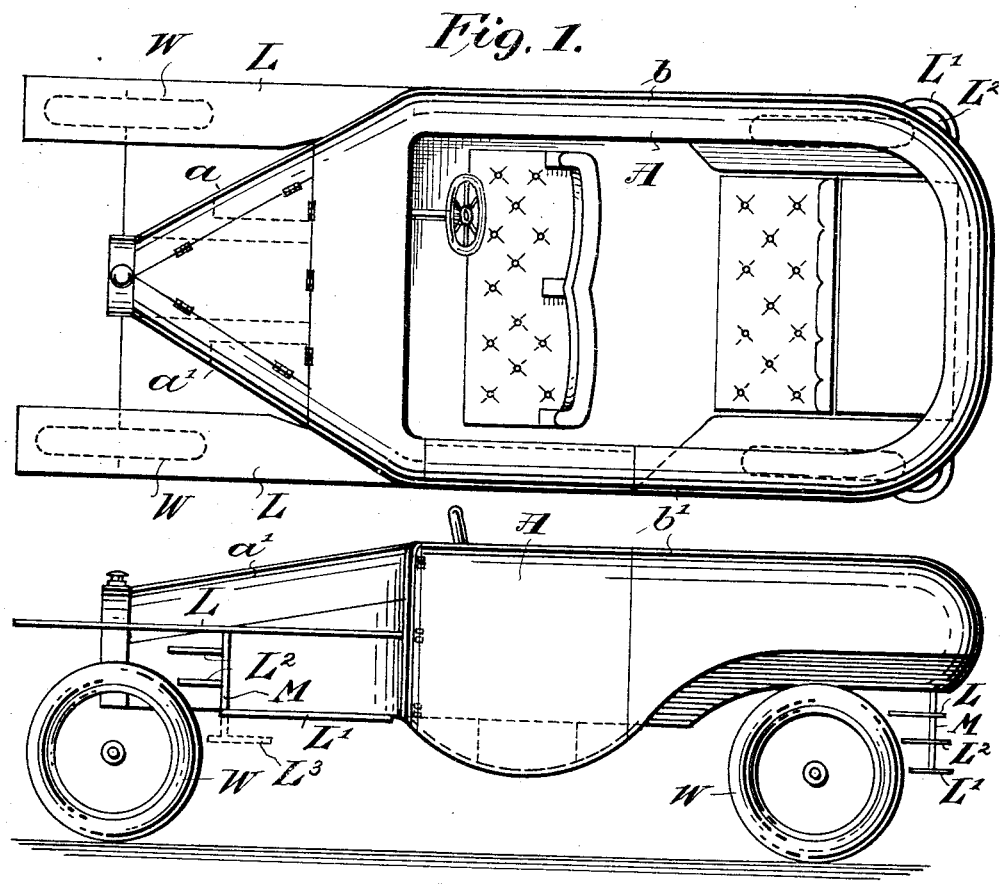

W. H. HOLLAND.
MUD GUARD FOR MOTOR VEHICLES.
APPLICATION FILED DEC. 19, 1913.

1,107,949.

Patented Aug. 18, 1914.
2 SHEETS—SHEET 1.

Witnesses:

Inventor:
William H. Holland.
By his Attorneys:

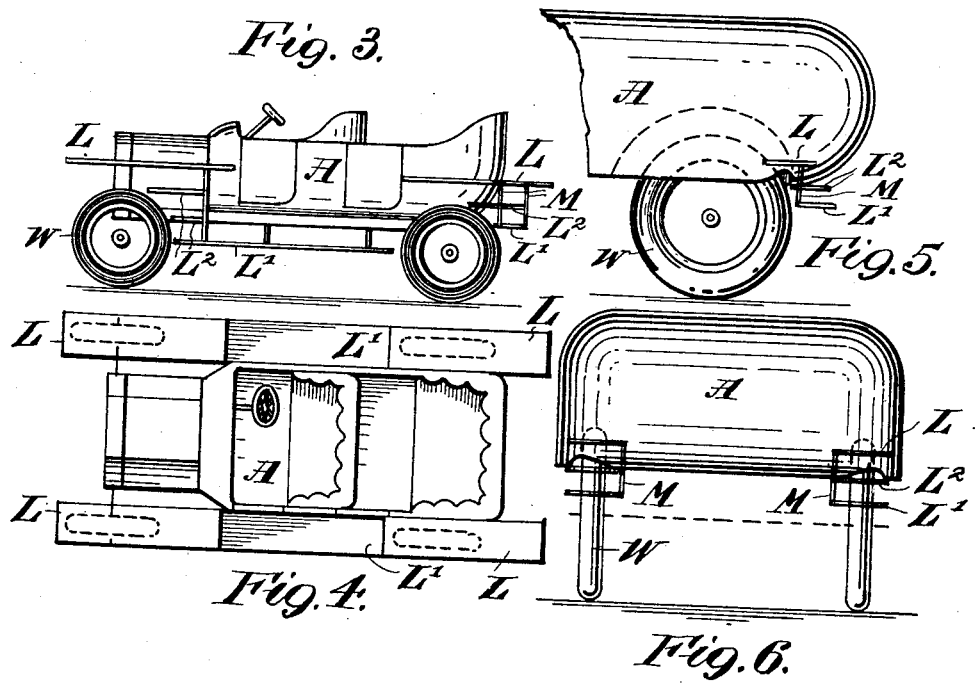

UNITED STATES PATENT OFFICE.

WILLIAM HEAP HOLLAND, OF ALDERLEY EDGE, ENGLAND.

MUD-GUARD FOR MOTOR-VEHICLES.

1,107,949. Specification of Letters Patent. Patented Aug. 18, 1914.

Application filed December 19, 1913. Serial No. 807,670.

*To all whom it may concern:*

Be it known that I, WILLIAM HEAP HOLLAND, a subject of the King of Great Britain and Ireland, and a resident of Alderley Edge, in the county of Chester, England, have invented new and useful Improvements in Mud-Guards for Motor-Vehicles, of which the following is a specification.

This invention relates to the construction of mudguards for motor cars and their disposition upon such cars. Its main object is to provide guards which will be of the highest efficiency in preventing mud being flung on to the body of the car, and which will give a minimum amount of wind resistance to the running of the car and will raise the minimum amount of dust in fine weather.

It has before been known with a motor vehicle wheel to employ a mudguard consisting of a single horizontally flat board or the like disposed either above or behind a wheel. Such a single board if placed above a wheel would have to be of impracticable width to stop all the laterally divergent streams of mud flung up by the wheel. If such a single board is placed behind a wheel only it cannot intercept the streams which leave the wheel above such board.

In carrying this invention into effect a plurality of horizontally flat boards are arranged in juxtaposition to a wheel and are so disposed relatively thereto and to one another that the different streams of mud flung up by the wheel are all caught or stopped by one or the other of the boards before such streams have laterally expanded or diverged sufficiently to pass outside boards of the width permissible in a motor vehicle.

In a convenient form each mudguard comprises a horizontal board or plate disposed above and behind the wheel. Below such board but behind the wheel is a like but shorter board or plate. Between these upper and lower plates are auxiliary guards consisting of short flat horizontal plates with their front edges or the front edges of one or more of them near to the wheel tire. Any such plate which closely approaches the tire may have a flexible and soft front edge to prevent any damage being done should the tire and plate touch each other.

The accompanying drawings illustrate the construction of the improved guards and their application to different types of motor car bodies.

Figures 1 and 2 show in plan and side elevation respectively their application to the front wheels of a wide motor car body of the type described in the specification to my application for British Letters Patent No. 29740 dated the 24th. December 1912. Figs. 3 and 4 illustrate in plan and side elevation respectively an ordinary type of car body with the improved mudguards fitted to both the front and rear wheels. Figs. 5 and 6 show in side view and in rear view respectively mudguards applied to the rear part of a car body similar generally to the body of Figs. 1 and 2. This body differs, however, from that shown in the earlier figures in having laterally inclosed pockets or recesses for the upper parts of the rear wheels. No claim is made herein for the rear part of a car constructed with such recesses or pockets.

Referring first to Figs. 1 and 2 each of the front wheel mudguards comprises a flat horizontal plate L so disposed as to be above and to extend behind the wheel W. The outer edges of the plates on opposite sides of the car are about parallel and merge into the parallel sides $b$, $b^1$, of the body A. The inner edges are shaped to fit the divergent sides $a$, $a^1$ of the bonnet or equivalent front part. Below the plates L and behind the wheels are shorter boards or plates $L^1$ parallel to the plates L. Between these upper and lower plates and above one another are further plates $L^2$ also horizontal. There are horizontal spaces left between contiguous plates through which the wind can sweep. The front edge of the plate $L^2$ which is in rear of the wheel may be adjusted as closely as possible to such front wheel tire. If adjusted very closely to a tire the front edge of a plate may be made soft and flexible or it may have a soft and flexible attachment such as a sheet of stiff vulcanized indiarubber or a row of brush bristles, to come into contact with the tire under any abnormal movements.

M, indicates one or two or more light bars extending from the upper plate L to the lower plate $L^1$ on the outer and inner edges of such plates and which serve for the attachment of the plates $L^2$.

In Figs. 3 and 4 similar guards are shown as applied to the front and rear wheels of a car of the present ordinary form. The construction of mudguard for the front wheels is the same as that already described in connection with Figs. 1 and 2, with the exception that the inner edges of the top and bottom plates are not shaped to conform to and fit upon the car body. The lower plate $L^1$ can be extended to form a step or steps. The mudguards for the rear wheel are generally similar to those of the front wheels but only one plate is used between the upper and lower plates L $L^1$. The improved mudguards are shown as applied to both front and rear wheels, but, if desired, they may be applied to the front wheels only or to the rear wheels only.

It is evident that the arrangement and disposition of parallel horizontal plates to form a mudguard with horizontal spaces left between them for the passage of wind may be considerably modified. Thus there may be more than two plates interposed between the upper and lower plates, or, even, such interposed plates may be dispensed with. Or plates may be placed lower than $L^1$ as shown in broken lines at $L^3$ in Fig. 2. Or the parallel plates may be disposed relatively to the wheels in a different manner to that already described. For example with the rear parts of the bodies illustrated in Figs. 1, 2, 5 and 6 the plates L $L^1$ composing a mudguard may be disposed as there shown in rear of and behind their wheels. As before M M represent thin bars or strips supporting the plates.

In the mudguards illustrated the plates are shown as being flat transversely as well as flat longitudinally. If desired, however, the plates or any of them may be transversely curved or bent, or may be provided with downwardly depending flanges along their edges in the same way as guards which curve to follow the circumference of their wheels are provided with such flanges. Any reference to a flat plate herein is only intended to refer to a plate which is flat longitudinally.

The plates applied to a wheel need not be so long as is shown in Figs. 1 to 4. They only require to be of sufficient length to come across the path or paths of the mud flung from the wheel.

The plates have been referred to as horizontal but by such a reference it is intended to include also plates which do not depart from the horizontal sufficiently to set up any considerable amount of resistance to the passage of wind set up by the running of the car. They are shown of much exaggerated thickness in the drawings.

What I claim is:—

1. A mudguard for a motor car body comprising a plurality of flat plates which, when combined with the car, will be about horizontally disposed one above another and will have approximately horizontal spaces between them for the passage of wind, substantially as hereinbefore described.

2. The combination with a motor car of a mudguard composed of a plurality of superposed flat plates about horizontally disposed and having between them approximately horizontal spaces for the passage of wind, substantially as hereinbefore described.

In witness whereof I have hereunto set my hand in the presence of two subscribing witnesses.

WILLIAM HEAP HOLLAND.

Witnesses:
 WILLIAM GEO. HEYS,
 JOHN WILLIAM THOMAS.

Copies of this patent may be obtained for five cents each, by addressing the "Commissioner of Patents, Washington, D. C."